United States Patent
Baldwin et al.

(10) Patent No.: US 6,793,421 B1
(45) Date of Patent: Sep. 21, 2004

(54) FOLDING KEYBOARD

(75) Inventors: Travis Baldwin, Chapel Hill, NC (US); Luis Ernesto Elizalde Rodarte, Durham, NC (US); John Peter Karidis, Ossining, NY (US); Susan Sommers Moffatt, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/447,460

(22) Filed: May 29, 2003

(51) Int. Cl.[7] ............... B41J 27/02; B41J 5/10; B41J 5/12; B41J 5/14; B41J 5/16; B41J 5/26; B41J 5/28

(52) U.S. Cl. .............. 400/488; 400/489; 400/472; 400/492; 400/88; 361/680

(58) Field of Search ................. 400/488, 489, 400/472, 492; 361/680

(56) References Cited

U.S. PATENT DOCUMENTS

| | | | |
|---|---|---|---|
| 5,574,481 A | * | 11/1996 | Lee ........................... 345/168 |
| 5,612,691 A | * | 3/1997 | Murmann et al. ............ 341/22 |
| 5,653,543 A | | 8/1997 | Abe |
| 5,712,760 A | | 1/1998 | Coulon et al. |
| 5,788,386 A | * | 8/1998 | Hayashi et al. ............. 400/489 |
| D416,068 S | | 11/1999 | Jezek |
| D420,655 S | | 2/2000 | Louis et al. |
| 6,088,220 A | | 7/2000 | Katz |
| 6,168,331 B1 | | 1/2001 | Vann |
| 6,174,097 B1 | | 1/2001 | Daniel |
| 6,552,281 B2 | * | 4/2003 | Katakami et al. ........... 200/5 A |
| 6,614,649 B1 | * | 9/2003 | Wang .......................... 361/680 |
| 6,625,011 B2 | * | 9/2003 | Hyun .......................... 361/680 |
| 6,679,639 B2 | * | 1/2004 | Katz .......................... 400/488 |
| 2002/0033761 A1 | * | 3/2002 | Katakami et al. ............ 341/22 |

* cited by examiner

Primary Examiner—Andrew H. Hirshfeld
Assistant Examiner—Marissa Ferguson
(74) Attorney, Agent, or Firm—Carlos Munoz-Bustamante; Ronald V. Davidge

(57) ABSTRACT

A keyboard for a small, portable computing device includes a pair of mating sections that can be folded together after they are pulled apart. The sections are releasably held together by a spring and by a sliding attachment structure that holds them in alignment. When the sections are pulled away from one another to release the sliding attachment structure, they are held together by a pivoting sliding attachment structure that allows folding.

12 Claims, 3 Drawing Sheets

FOLDING KEYBOARD

BACKGROUND OF THE INVENTION

1. Field of the Invention

This invention relates to computer keyboards, and more particularly to folding keyboards for use with very small portable computers.

2. Summary of the Background Art

An increasing use of computing devices that are significantly smaller than laptop computers, such PDAs (Personal Digital Assistants), and palmtop computers, together with the increasing ability of such devices to perform activities, such as word processing and spreadsheet operations, that have been traditionally associated with laptop and desktop computers, have led to an increasing need for suitable keyboards to use with such devices. A suitable keyboard would have keys, at least in the area of the alphabetical keys, of the standard size and configuration, together with a small overall size of the keyboard, and with an ability of the keyboard to be folded.

This need has been met by a number of designs for folding keyboards including at least some standard-sized keys. In general, these designs fall either into a first category, in which the key pattern is split into two sections, placed on opposite sides of a hinge extending across the center of the keyboard, or into a second category, in which provision is made for folding the keyboard across a conventionally staggered key pattern of the keyboard.

Examples of keyboards in this first category are described in U.S. Pat. Nos. 5,712,769, 6,168,331, U.S. Des. Pat. No. 420,655, and U.S. Des. Pat. No. 416,008. Disadvantages of such keyboards arises from the fact that the familiar pattern of a single group of staggered alphanumeric keys, as generally used for typing, cannot be provided and from the fact that the keyboard must be made larger in both its folded and open conditions to provide for spacing the two key patterns apart. Additionally, what is needed is a first latching mechanism for holding the keyboard in a folded condition, so that it can be conveniently carried without being inserted in a special carrying case, and a second latch for holding the keyboard in a fully open, or deployed condition, so that it can be readily used for typing on a soft or curved surface such as the user's lap.

Examples of keyboards in the second category are described in U.S. Pat. Nos. 5,653,543, 6,088,220, and 6,174,097. Such keyboards must employ a solution to the problem of hinging the staggered key pattern so that the keys projecting partly past the hinge line from one side of the keyboard do not prevent the other side of the keyboard from being folded upward.

One solution to this problem is to split one or more keys at the hinge line into two parts, with one part on each side of the keyboard, and to make other keys at the hinge line smaller than their standard size, so that they each lie on only one side of the hinge line. A disadvantage of this solution, which is applied to one of the embodiments of U.S. Pat. No. 6,088,220, arises from these deviations from a standard keyboard.

Another solution to this problem is to mount a portion of each of several rows of keys within the keyboard to slide as a unit away from the hinge line before the keyboard is folded. Disadvantages of this solution arise from the complexity of mounting groups of keys to slide laterally together, and further from the fact that it is necessary to rely on the user to move these sections before the keyboard can be folded and before the keyboard can be used after being unfolded, in the method described as another embodiment of U.S. Pat. No. 6,088,220. Alternately, separate mechanisms may be employed, as described in U.S. Pat. No. 6,174,097, to provide for movement of the key segments as the keyboard is folded and unfolded. U.S. Pat. No. 6,174,097 also describes a mechanism for locking the keyboard in its unfolded condition, but this mechanism has the disadvantage of requiring a separate action of the user.

Yet another solution to this problem is to pivotally attach the two keyboard sections by means of a number of coupling links, with each coupling link including a first hole through which a rod within the first section of the keyboard extends and a second hole, spaced apart from the first hole, through which a rod from the second portion of the keyboard extends. As the second section of the keyboard is folded over the first, it is moved upward by the distance between the holes in each of the coupling links. A disadvantage of this method, as it is described in U.S. Pat. No. 5,653,543, arises from the fact that a latching means is not provided to hold the keyboard in its open, or deployed condition, so that it cannot readily be used on a curved or soft surface, such as the user's lap.

What is needed is a simple mechanism providing for folding a keyboard having a conventionally staggered key pattern so that the keys of the opposite sections face one another with the keyboard in a folded condition, with the mechanism also locking the keyboard in a fully open condition so that it can be readily used on a curved or soft surface.

SUMMARY OF THE INVENTION

According to a first aspect of the invention, a keyboard, including a proximal section, a distal section, a sliding attachment structure, and a folding attachment structure, is provided. The proximal section includes a first plurality of keys. The distal section includes a second plurality of keys. Depression of each key in the first and second pluralities causes generation of an electrical signal. The sliding attachment structure releasably holds the proximal section together with the distal section and in alignment with the distal section. The sliding attachment structure releases the proximal section from being held in alignment with the distal section as the proximal and distal sections are pulled apart. The folding attachment structure movably attaches the proximal section and the distal section permitting the proximal section to be folded against the distal section with the sliding attachment structure releasing the proximal section from being held in alignment with the distal section.

Preferably, the first and second pluralities of keys coextend along a staggered line, being disposed upward, when the proximal and distal sections are held in alignment. When the proximal section is folded against the distal section, the first plurality of keys is disposed to face the second plurality of keys.

Preferably, the keyboard also includes a spring applying a force to the sliding attachment structure to hold the proximal and distal sections together with the sliding attachment structure. Preferably, the keyboard also includes a latch releasably holding the proximal section folded against the distal section.

Preferably, the sliding attachment structure includes a receptacle extending within the distal section and a plug extending from the proximal section to slide in the receptacle. Preferably, the folding attachment structure includes a coupling link and a slider, with the coupling link being pivotally attached to one of the sections at a first end of the coupling link, and with the slider being slidably mounted in the other of the section and being pivotally attached to the coupling link at a second end of the coupling link.

DETAILED DESCRIPTION OF THE INVENTION

Figure 1:
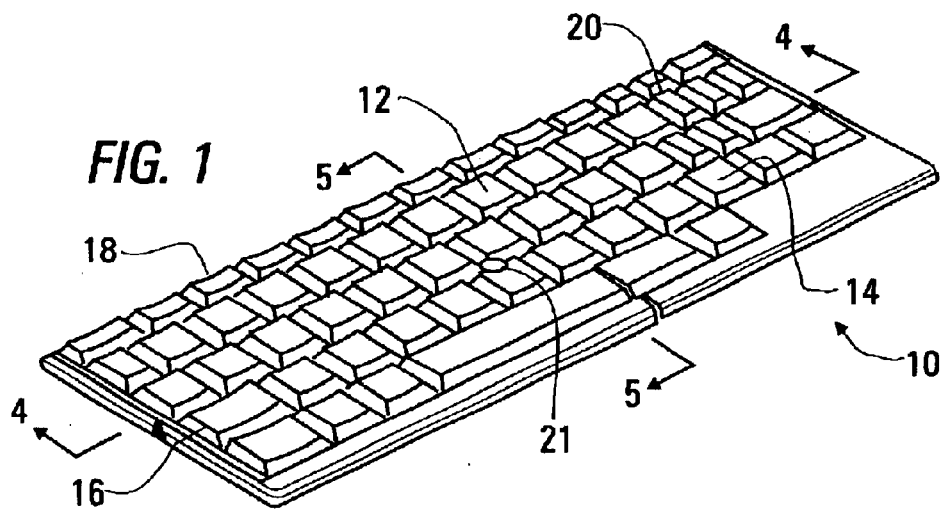
FIG. 1 is a perspective view of a keyboard built in accordance with the present invention in an open condition.

FIG. 1 is a perspective view of a keyboard 10 built in accordance with the present invention in the open condition in which it is used to provide user input data for a small portable computer system. The keyboard 10 includes a number of modifications reducing its overall size or "footprint" without impacting usability in handling common functions, such as word processing. Specifically, the alphabetic keys 12 retain their conventional size and location, along with keys 14 used for the most common punctuation marks, such as the comma (,), period (.), and question mark (?), and at least certain keys 16 used for capitalization. The numeric keys 18 are placed in their conventional locations, but are reduced in height by about half. Other keys 20, used for typing less frequently used symbols, are substantially reduced in width. All of the keys are relatively thin in the vertical direction, being of a configuration conventionally used in laptop computers. The keyboard 10 may also include a pointing device 21.

Figure 2:
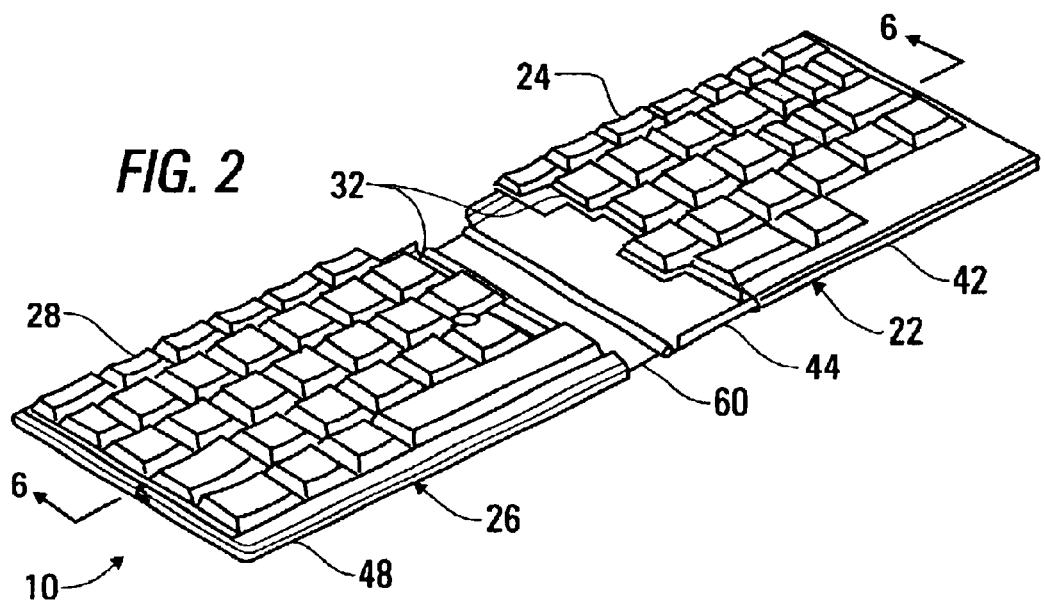
FIG. 2 is a perspective view of the keyboard of FIG. 1 in an extended condition.

FIG. 2 is a perspective view of the keyboard 10 in an extended condition, in which it is held by the user during the process of folding or unfolding. The keyboard 10 is divided into a proximal section 22, including proximal keys 24, and a distal section 26, including distal keys 28. When the keyboard 10 is in the open condition of FIG. 1, the proximal keys 24 and the distal keys 28 mesh together, being upwardly disposed, in the direction of arrow 30. When the keyboard 10 is in the open condition of FIG.2, the proximal keys 24 and the distal keys 28 are pulled apart from one another, forming mating, staggered end surfaces 32 within a region in which the proximal and distal keys 24, 28 coextend along the length of the keyboard 10.

Figure 3:
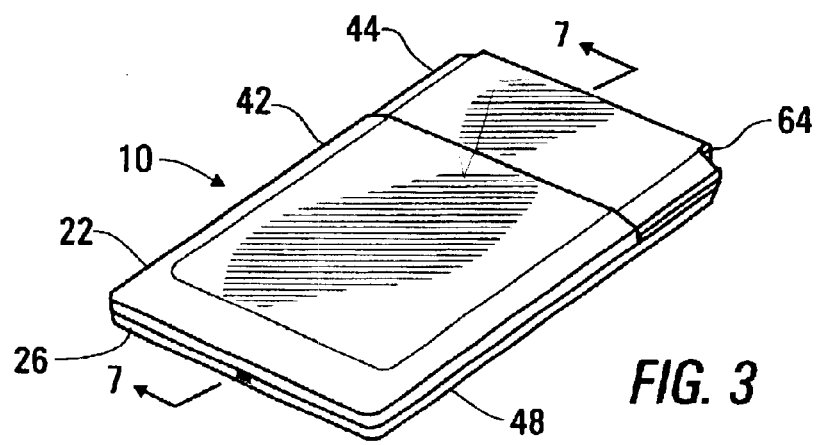
FIG. 3 is a perspective view of the keyboard of FIG. 1 in a folded condition.

FIG. 3 is a perspective view of the keyboard 10 in a folded condition, with the proximal section 22 being folded over the distal section 26.

Figure 4:
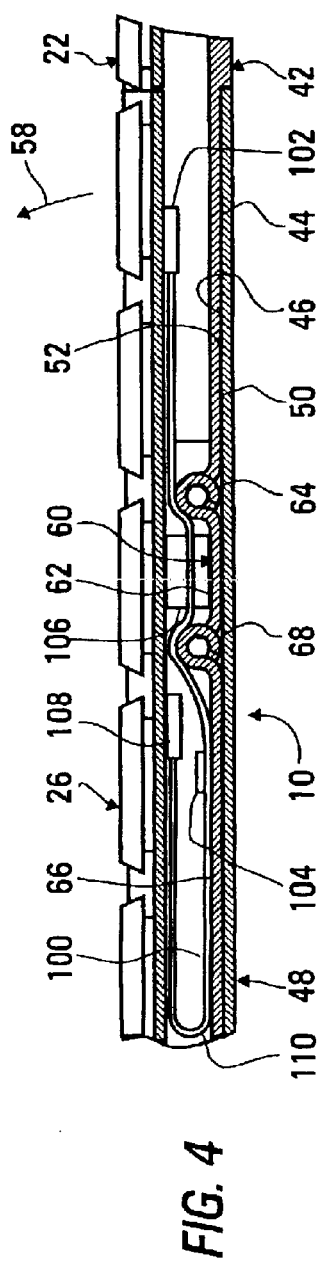
FIG. 4 is a fragmentary longitudinal cross-sectional view of the keyboard of FIG. 1 in its open condition, taken as indicated by section lines 4—4 in FIG. 1.
Figure 5:
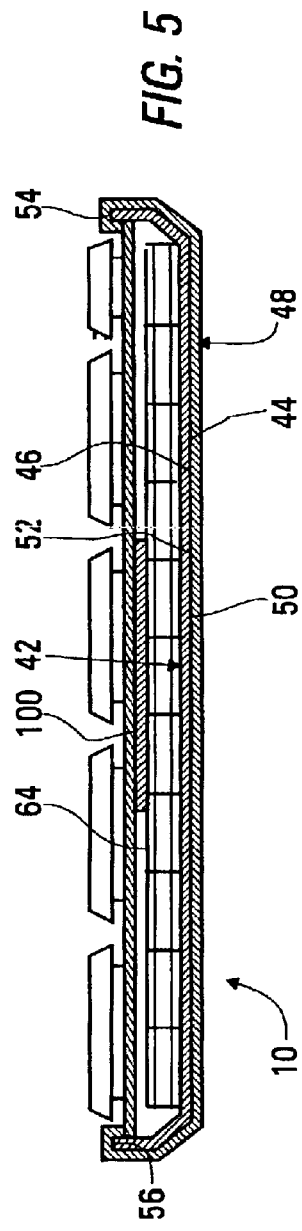
FIG. 5 is a fragmentary transverse cross-sectional view of the keyboard of FIG. 1, in its open condition, taken as indicated by section lines 5—5 in FIG. 1.

FIGS. 4 and 5 show the keyboard 10 in the open condition of FIG. 1, with FIG. 4 being a fragmentary longitudinal cross-sectional elevation, taken as indicated by section lines 4—4 in FIG. 1, and with FIG. 5 being a transverse cross-sectional elevation, taken as indicated by section lines 5—5 in FIG. 1. The proximal section 22 of the keyboard 10 includes a proximal housing 42 having a plug 44 fitting within a receptacle 46 of the distal housing 48 of the distal keyboard section 26, when the keyboard 10 is in the open position of FIGS. 4 and 5. The plug 44 is slidably retained within the receptacle 46, for example with an outer surface 50 of the plug 44 sliding along an inner surface 52 of the receptacle 46 and with upper edges 54 of the plug 44 sliding along retaining surfaces 56 of the receptacle 46. When the keyboard 10 open, as shown in FIGS. 4 and 5, the engagement of the plug 44 within the receptacle 46 holds the proximal section 22 in alignment with the distal section 26, preventing folding movement of the proximal section 22 relative to the distal section 26 in the direction of arrow 58.

Figure 6:
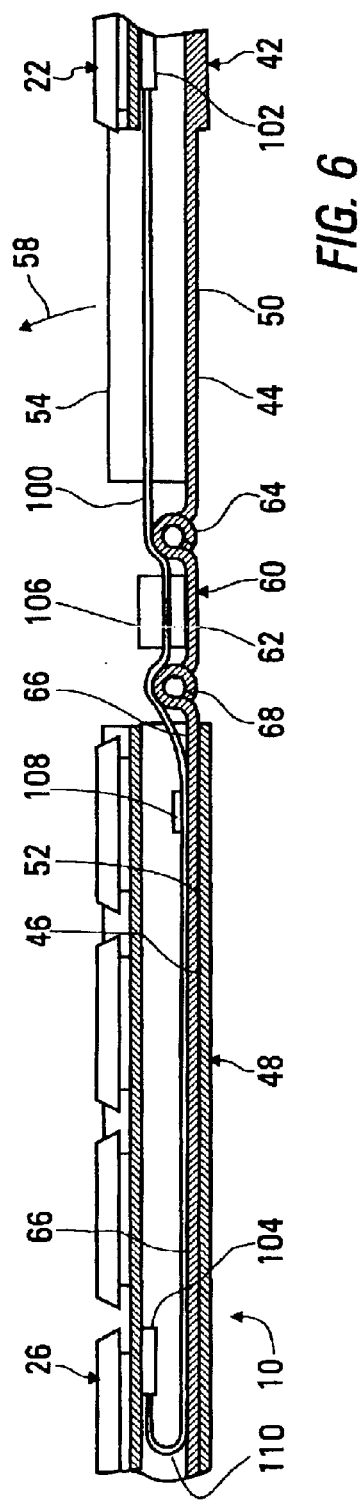
FIG. 6 is a fragmentary longitudinal cross-sectional view of the keyboard of FIG. 1 in its extended condition, taken as indicated by section lines 6—6 in FIG. 2.

FIG. 6 is a fragmentary longitudinal cross-sectional elevation of the keyboard 10 in the extended condition of FIG. 2, taken as indicated by section lines 6—6 in FIG. 2. The proximal housing 42 is connected to the distal housing 48 by means of a sliding attachment mechanism 60 including a coupling link 62 pivotally attached to the proximal housing 42 at a first hinge 64 and a slider 66 pivotally attached to the coupling link 62 at a second hinge 68 and slidably mounted within the distal housing 48. In the example of the figures, the slider 66, having the same transverse shape as the plug 44, also slides within the receptacle 46. Alternately, the slider may have a different shape, being slidably mounted within a different receptacle in the distal housing 48. With the keyboard 10 in this extended position of FIG. 6, proximal section 22 can be folded against the distal section 26 by movement in the direction of arrow 58, with pivoting motions occurring at the hinges 64, 68.

Figure 7:
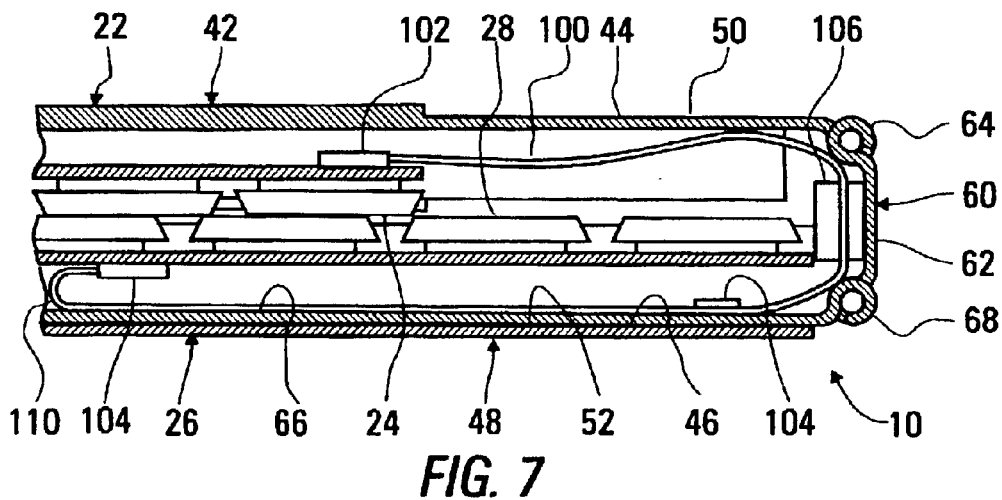
FIG. 7 is a fragmentary longitudinal cross-sectional view of the keyboard of FIG. 1 in its folded condition, taken as indicated by section lines 7—7 in FIG. 3.

FIG. 7 is a fragmentary longitudinal cross-sectional elevation of the keyboard 10 in the folded condition of FIG. 3, taken as indicated by section lines 7—7 in FIG. 3, with the proximal keys 24 and distal keys 28 being held against one another.

Figure 8:
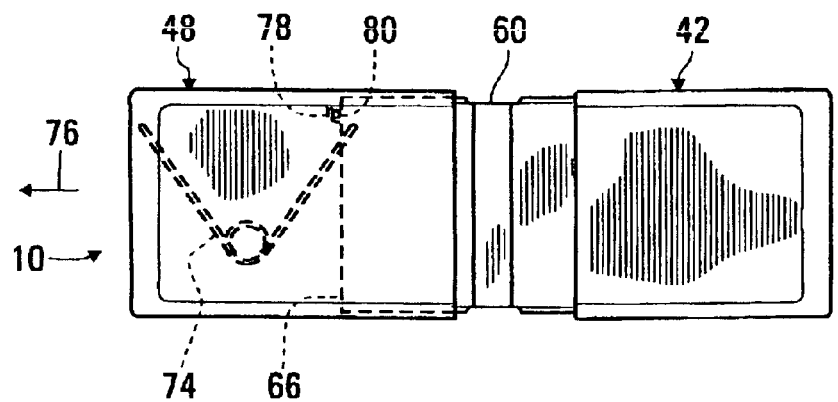
FIG. 8 is an underneath plan view of the keyboard of FIG. 1 in its extended condition.

FIG. 8 is a bottom plan view of the keyboard 10 in the extended condition, as otherwise shown in FIGS. 2 and 6. The slider 66 is additionally attached within the distal housing 48 to a spring 74, pulling the slider 66 in the direction of arrow 76. This arrangement holds the keyboard 10 in its open condition, as shown in FIGS. 1, 4, and 5, so that the process of folding the keyboard 10 can only be initiated by a deliberate action of the user to pull the proximal and distal sections 22, 26 apart into the extended condition of FIGS. 2, 6, and 8. Preferably, the slider 66 also includes a flange 78 contacting a pin 80 in the distal housing 48, limiting the movement of the slider 66 in the direction of arrow 76.

Figure 9:
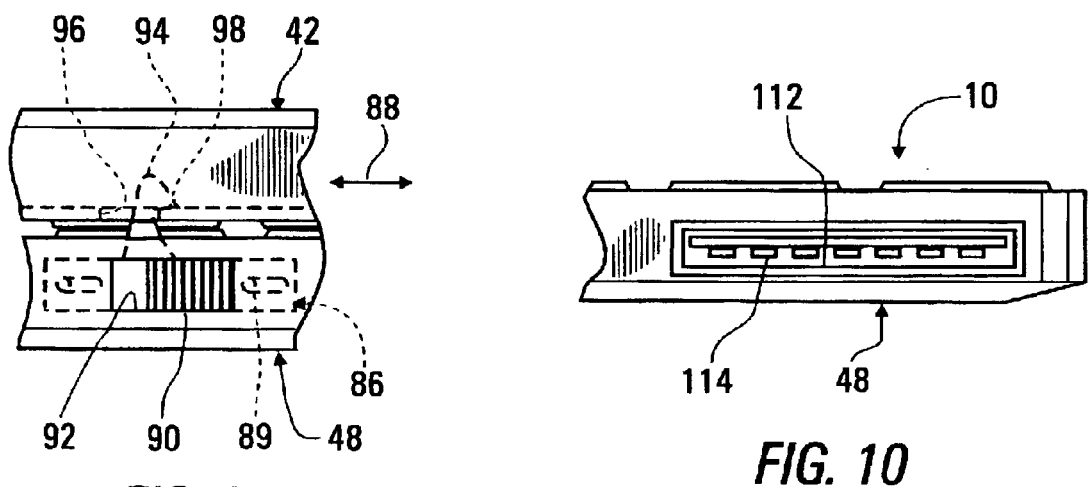
FIG. 9 is a fragmentary left end elevation of the keyboard of FIG. 1, showing a releasable latch.

FIG. 9 is a fragmentary left end view of the keyboard 10 in the folded condition of FIGS. 3 and 7, showing a sliding latch 86 releasably holding the keyboard 10 in this folded condition. The latch 86 is mounted to slide in the directions of arrow 88 on a pair of pins 89 within the distal housing 48, being moved by a tab 90 extending through a slot 92. The latch 86 includes a hook 94 extending through a slot 96 in the proximal housing 42, with the keyboard 10 folded, to releasably engage a latching surface 98 adjacent the slot 96.

Referring again to FIGS. 4–7, electrical circuits within the proximal section 22 and the distal section 26 are preferably connected by means of a flexible electrical cable 100, extending between a connector 102 within the proximal section 22 and a connector 104 in the distal section 26. The electrical cable 100 is additionally held in place by a slotted retaining clip 106 attached to the coupling link 62 and by a clamp 108 attached to the slider 66. The electrical cable 100 includes a loop 110, which accommodates a change in the distance between the connectors 102, 104 as the keyboard 10 is moved between the open condition of FIG. 4 and the extended condition of FIG. 6. The flexibility of the electrical cable 100 further accommodates bending as the keyboard 10 is moved into the folded condition of FIG. 7.

Figure 10:
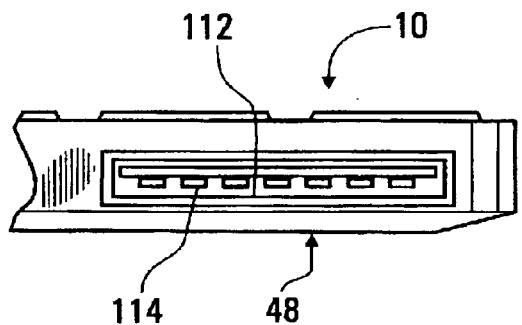
FIG. 10 is a fragmentary rear elevation of the keyboard of FIG. 1, showing a provision for attachment of an external electrical cable.

FIG. 10 is a fragmentary rear view of the keyboard 10, showing a provision made for electrical cable attachment to an external system, such as a small portable computer. This provision includes a slot 112 forming a receptacle within the distal housing 48, in which a number of contact terminals 114 are disposed for contact with a mating cable connector.

As described herein, the proximal section 22 is the section from which a plug 44 extending into a receptacle 46 within the distal section 26. Within the sliding attachment structure 60, the coupling link 62 is pivotally mounted to the proximal section 22, while the slider 66 is slidably mounted to the distal section. It is understood that, alternately, the coupling link 62 can be pivotally mounted to the distal section 26, while the slider is slidably mounted to the proximal section 22, without departing from the spirit and scope of the invention, While the invention has been described in its preferred embodiment with some degree of particularity, it is understood that this description has been given only by way of example, and that numerous changes can be made without departing from the spirit and scope of the invention.

What is claimed is:

1. A keyboard comprising:
   a proximal section including a first plurality of keys, wherein depression of each key in said first plurality causes generation of an electrical signal, and a plug extending at an end of said proximal section;
   a distal section including a second plurality of keys, wherein depression of each key in said second plurality causes generation of an electrical signal, a first receptacle extending within said distal section, wherein said plug slides within said first receptacle to releasably hold said proximal section together with said distal section and in alignment with said distal section as said proximal and distal sections are held together;
   a coupling link pivotally attached at a first end of said coupling link to an end of said proximal section; and
   a slider attached to slide within said second receptacle in said distal section and pivotally attached to said coupling link at a second end of said coupling link, opposite said first end thereof, wherein sliding movement of said slider within said second receptacle to pull said proximal section away from said distal section releases said proximal section from being held in alignment with said distal section.

2. The keyboard of claim 1, wherein
   said first and second pluralities of keys are disposed upward with said proximal and distal sections held together and in alignment, and
   said first plurality of keys is disposed to face said second plurality of keys with said proximal section folded against said distal section.

3. The keyboard of claim 2, wherein said first and second pluralities of keys coextend along a staggered line with said proximal and distal sections held together in alignment with one another.

4. The keyboard of claim 1, additionally comprising a spring applying a force to said slider to hold said proximal and distal sections together with said slider and said coupling link.

5. The keyboard of claim 1, additionally comprising a latch releasably holding said proximal section folded against said distal section.

6. The keyboard of claim 1, additionally comprising a flexible electrical cable including a loop extending between a first attachment point within said proximal section and a second attachment point within said distal section, wherein said loop moves as said proximal and distal sections are pulled apart to release said proximal section from being held in alignment with said distal section by said sliding attachment structure.

7. A keyboard comprising:
   a proximal section including a first plurality of keys, wherein depression of each key in said first plurality causes generation of an electrical signal, a plug extending at an end of said proximal section, and a first receptacle extending within said proximal section;
   a distal section including a second plurality of keys, wherein depression of each key in said second plurality causes generation of an electrical signal, a second receptacle extending within said distal section, wherein said plug slides within said second receptacle to releasably hold said proximal section together with said distal section and in alignment with said distal section as said proximal and distal sections are held together;
   a coupling link pivotally attached at a first end of said coupling link to an end of said distal section; and
   a slider attached to slide within said first receptacle in said proximal section and pivotally attached to said coupling link at a second end of said coupling link, opposite said first end thereof, wherein sliding movement of said slider within said first receptacle to pull said proximal section away from said distal section releases said proximal section from being held in alignment with said distal section.

8. The keyboard of claim 7, wherein
   said first and second pluralities of keys are disposed upward with said proximal and distal sections held together and in alignment, and
   said first plurality of keys is disposed to face said second plurality of keys with said proximal section folded against said distal section.

9. The keyboard of claim 8, wherein said first and second pluralities of keys coextend along a staggered line with said proximal and distal sections held together in alignment with one another.

10. The keyboard of claim 7, additionally comprising a spring applying a force to said slider to hold said proximal and distal sections together with said slider and said coupling link.

11. The keyboard of claim 7, additionally comprising a latch releasably holding said proximal section folded against said distal section.

12. The keyboard of claim 7, additionally comprising a flexible electrical cable including a loop extending between a first attachment point within said proximal section and a second attachment point within said distal section, wherein said loop moves as said proximal and distal sections are pulled apart to release said proximal section from being held in alignment with said distal section by said sliding attachment structure.

* * * * *